United States Patent
Martin

(10) Patent No.: US 8,424,951 B1
(45) Date of Patent: Apr. 23, 2013

(54) DEVICE AND METHOD FOR REPLACING A BOW IN A COVER ON A TRUCK

(76) Inventor: William P. Martin, Huntley, IL (US)

( * ) Notice: Subject to any disclaimer, the term of this patent is extended or adjusted under 35 U.S.C. 154(b) by 0 days.

(21) Appl. No.: 12/927,320

(22) Filed: Nov. 12, 2010

(51) Int. Cl.
*B60P 7/04* (2006.01)

(52) U.S. Cl.
USPC ..................................... 296/100.13; 296/118

(58) Field of Classification Search .............. 296/100.11–100.13, 105, 118
See application file for complete search history.

(56) References Cited

U.S. PATENT DOCUMENTS

| 4,801,171 A | 1/1989 | Weaver |
| 5,080,423 A | 1/1992 | Merlot et al. |
| 5,240,304 A | 8/1993 | Cramaro et al. |
| 5,429,408 A | 7/1995 | Henning et al. |
| 5,938,270 A | 8/1999 | Swanson et al. |
| 6,142,554 A | 11/2000 | Carroll et al. |
| 6,527,331 B2 | 3/2003 | Searfoss |
| 6,981,734 B2 | 1/2006 | Martin |
| 7,367,606 B2 | 5/2008 | Ellis |

FOREIGN PATENT DOCUMENTS

WO  WO 2009/027285 A1  3/2009

*Primary Examiner* — Dennis Pedder
(74) *Attorney, Agent, or Firm* — Mathew R. P. Perrone, Jr.

(57) ABSTRACT

A mounting slide clamp for a bow of a cover assembly, which permits the bow to be easily removed or replaced, the cover assembly including a cable drawing system to cover or uncover the open trailer with a tarpaulin, the tarpaulin being supported on the cable drawing system with at least one bow, and the mounting slide facilitating the repair thereof.

9 Claims, 12 Drawing Sheets

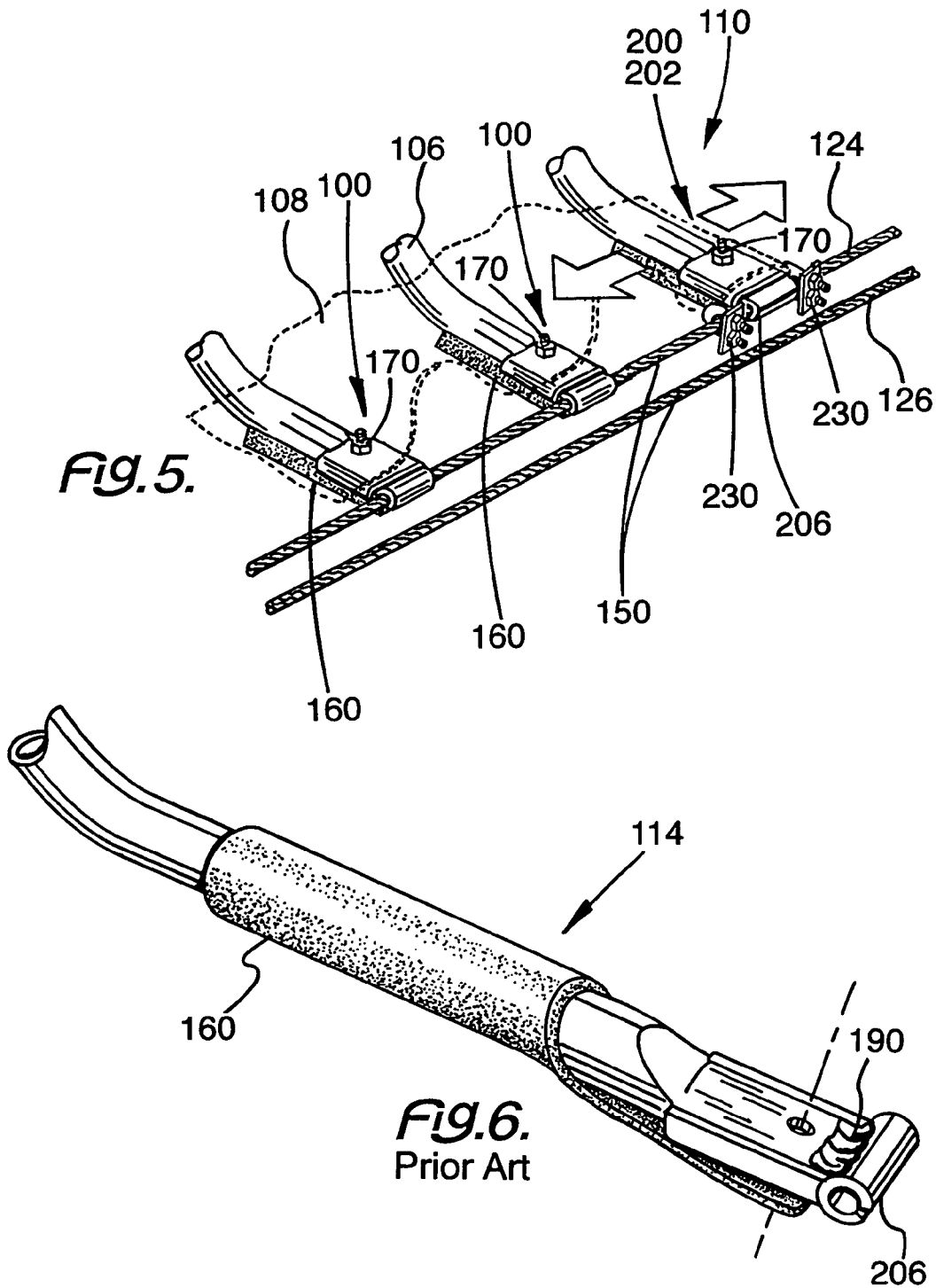

US 8,424,951 B1

DEVICE AND METHOD FOR REPLACING A BOW IN A COVER ON A TRUCK

This invention relates to a device and method for replacing a bow in a cover on a truck and more particularly to a bow for supporting a device and method for replacing a bow in a cover on a truck using a slide clamp to selectively release a supporting bow, which secures a cover in a cover assembly to an open bed of a truck.

BACKGROUND OF THE INVENTION

Within the trucking industry, hauling of loose material in an open bed of a truck is quite common. This loose material can sometimes fall off of a truck and be hazardous to other vehicles, as well as to the truck itself. To that end, it is extremely valuable to be able to provide a cover assembly to efficiently cover and uncover the truck bed.

Typically, such a cover assembly includes a tarpaulin. The tarpaulin is supported on a series of bows, which slide along opposing rails or cables mounted at an edge of the hauling bed of the truck. Each bow has a mounting clamp at each end thereof in contact with the opposing support rails. The rails, the bows, the tarpaulin or other cover, and the mounting slide clamps form the cover assembly for the open bed of a truck.

This cover assembly operates in a harsh environment on the bed of a truck. A gravel pit is one area of a load for such a truck. Many farm uses are also available for such a truck. These areas of use create a harsh environment for the operation of the cover assembly. With this harsh environment, the cover assembly can malfunction.

A main area of malfunction for the cover assembly can occur with the mounting clamp and the bow itself are damaged. Sliding of the clamp along the rail is critical to the function of the cover assembly. As the mounting slide clamp receives the rail, that portion of the slide clamp, which receives the rail can be damaged and interfere with the proper sliding therealong. While it is desirable to avoid that problem, it is also desirable to solve that problem efficiently when it does occur.

Problems are also created when one or more of the bows become deformed. For the cover assembly to work properly, the bows in the tarpaulin must maintain their shapes. Use of the cover assembly or undue weight on top of the cover assembly can damage the cover assembly. Such undue weight can occur, for example, when a load is aimed for the bed of the truck with the bed covered by the cover assembly. More specifically, such action can deform one or more of the bows, as well as the clamps.

Therefore, it is desirable to repair or replace the bow clamp as efficiently as possible. With the additional requirement that the mounting slide clamp be strong and durable, so that the cover assembly can withstand those, above-described, harsh conditions; it becomes difficult to make the bow and mounting slide clamp easily replaceable or repairable.

Thus, it may be seen that all desired features of the bow replacement are hard to maximize, without compromising some of the other desired features. Compromises must be made, to provide a proper bow and an attached mounting clamp for a greatly simplified replacement. If such compromises can be minimized, a most desirable replacement bow slide clamp can be achieved.

Furthermore, repair time for the bow can be a problem. The faster a deformed bow can be replaced, the faster the vehicle can be put back in service.

SUMMARY OF THE INVENTION

Among the many objectives of the present invention is the provision of a mounting slide clamp for a bow of a cover assembly used to cover a truck trailer bed, to facilitate replacement of a damaged bow.

Another objective of the present invention is the provision of mounting slide clamp for a bow of a cover assembly, which is easily disassembled for a damaged bow to be removed.

Also, an objective of the present invention is the provision of a mounting slide clamp for a bow of a cover assembly, which is easily disassembled for a bow in a cover assembly to be replaced.

Moreover, an objective of the present invention is the provision of a mounting slide clamp on a bow for a cover assembly, which is durable.

These and other objectives of the invention (which other objectives become clear by consideration of the specification, claims and drawings as a whole) are met by providing a mounting slide clamp for a bow of a cover assembly, which permits the bow to be easily removed or replaced.

BRIEF DESCRIPTION OF DRAWINGS

FIG. 5 depicts a perspective view of a cover assembly 110 with a U-bolt 230 securing fixed end member 200 to cables 150.

FIG. 6 depicts a perspective view of standard bow 114 of the prior art.

Throughout the figures of the drawings, where the same part appears in more than one figure of the drawings, the same number is applied thereto.

DESCRIPTION OF THE PREFERRED EMBODIMENTS

Figure 1:
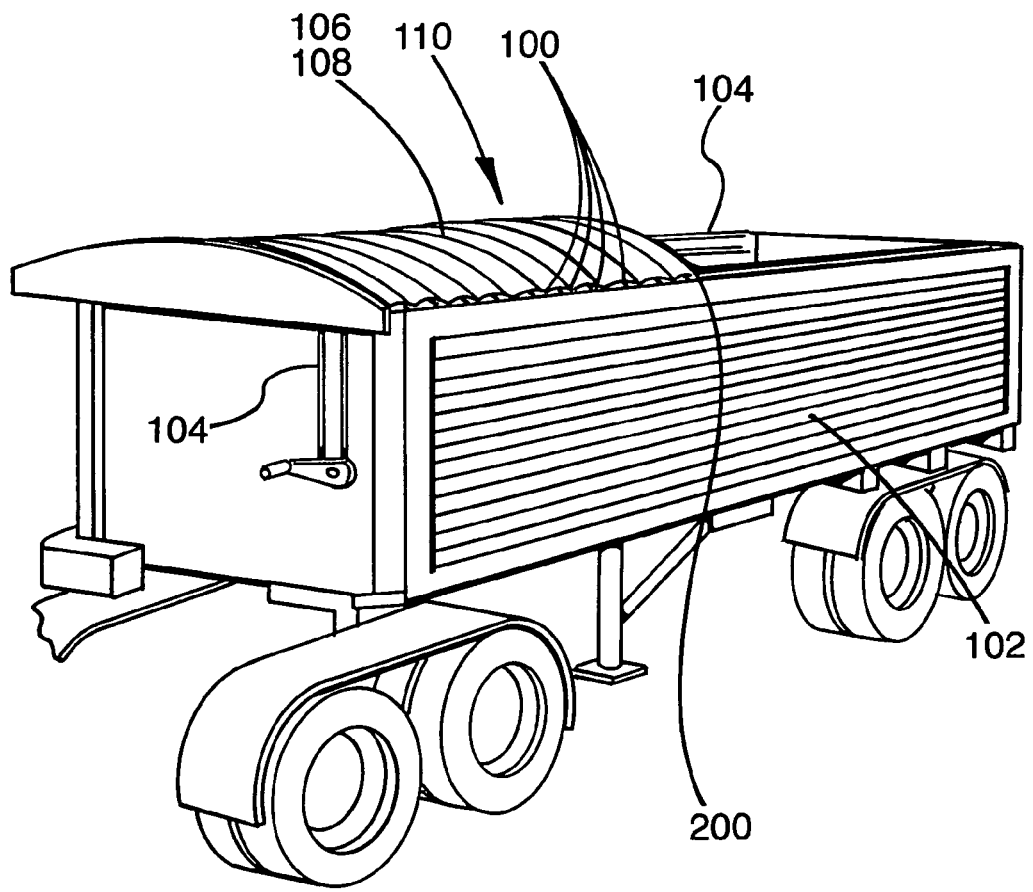
FIG. 1 depicts a prior art cover system with a perspective view of truck trailer 102 with cable drawing system 104.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

With the slide clamp of this invention, an open bed truck can be efficiently covered and uncovered. The cover assembly can be efficiently applied or removed as desired. The cover assembly includes a large piece of flexible material generally referred to as a tarpaulin. The material is supported on a series of bows. The opposing ends of each bow are secured to oppositely disposed mounting rails (also referred to as cables) with this slide clamp. The slide clamp permits the bow and the tarpaulin is to slide along the mounting rails and cover or uncover the bed of the vehicle as desired. The mounting rails are secured along opposing sides of the truck trailer.

The mounting slide clamp includes a series of open end clamps and at least one fixed end clamp. The open end clamps can be easily removed and applied to the mounting rails or cables. The fixed end clamp provided a grip on the mounting rails to allow the tarp to cover and uncover the truck trailer. Yet, the strength of the mounting slide clamp is maintained.

Figure 2:
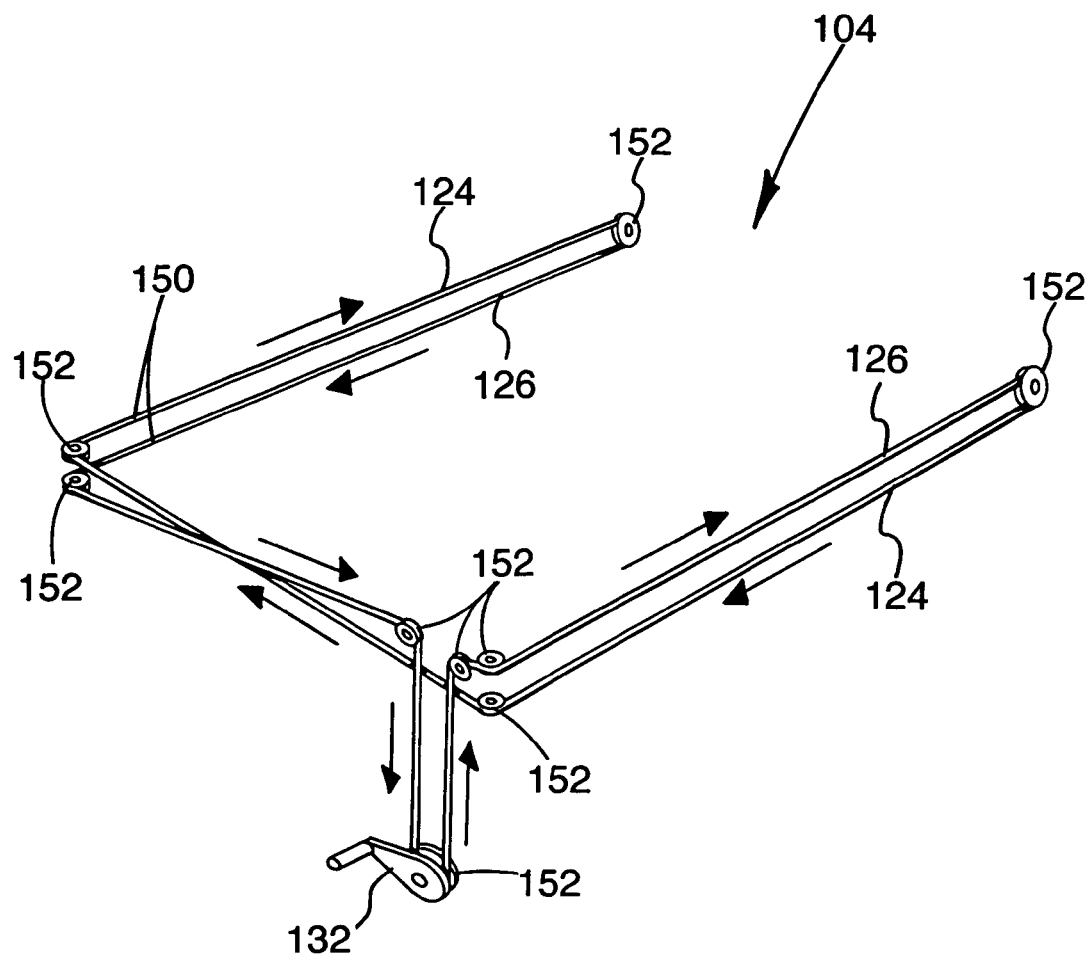
FIG. 2 depicts a prior art cable drawing system 104 used in FIG. 1 for cover assembly 110.

Referring now to FIG. 1 and FIG. 2, the prior art can clearly be seen. On a standard truck trailer 102, a cable drawing system 104 cooperates with bows 106 and tarp cover 108 to properly position tarp cover 108. Reinforced sliding members 100 secure tarp cover 108 to truck trailer 102. Fixed end member 200 ensures that reinforced sliding members 100 do not slide off truck trailer 102.

Referring specifically to the prior art of FIG. 2, a structure for a cable drawing system 104 can be clearly seen. Cables 150 cooperate with pulleys 152 to open and close tarp cover 108. A series of cables 150 run along each side of truck trailer 102 and on the front end of truck trailer 102. Cables 150 are connected to crank 132 through pulleys 152. Cables 150 include working side cable 124 and travel side cable 126.

When crank 132 is turned, working side cable 124 and travel side cable 126 move in order to open or close tarp cover 108. A series of pulleys 152 aid in the movement of working side cable 124 and travel side cable 126 to ensure a fluid and consistent movement of the cables 150.

Figure 3:
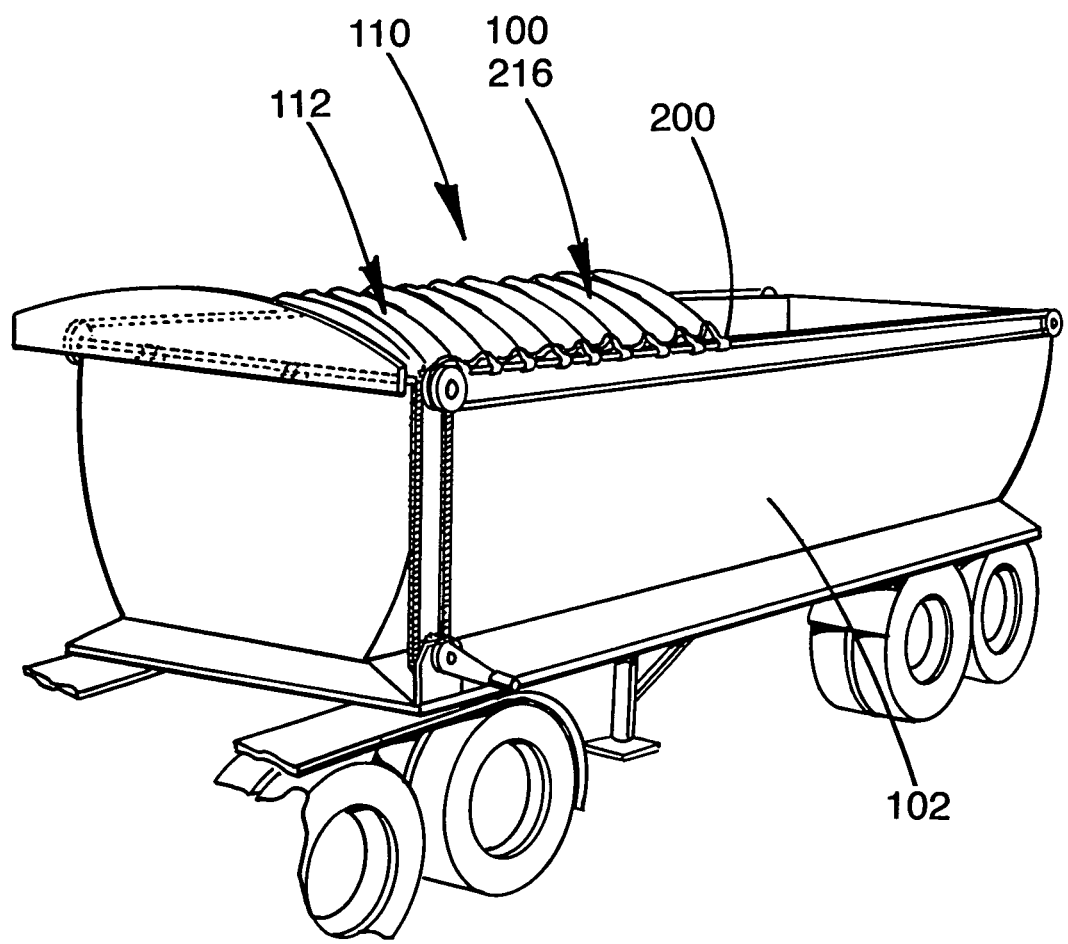
FIG. 3 depicts a perspective view of truck trailer 102 with a second embodiment of a prior art cable drawing system 112.
Figure 4:
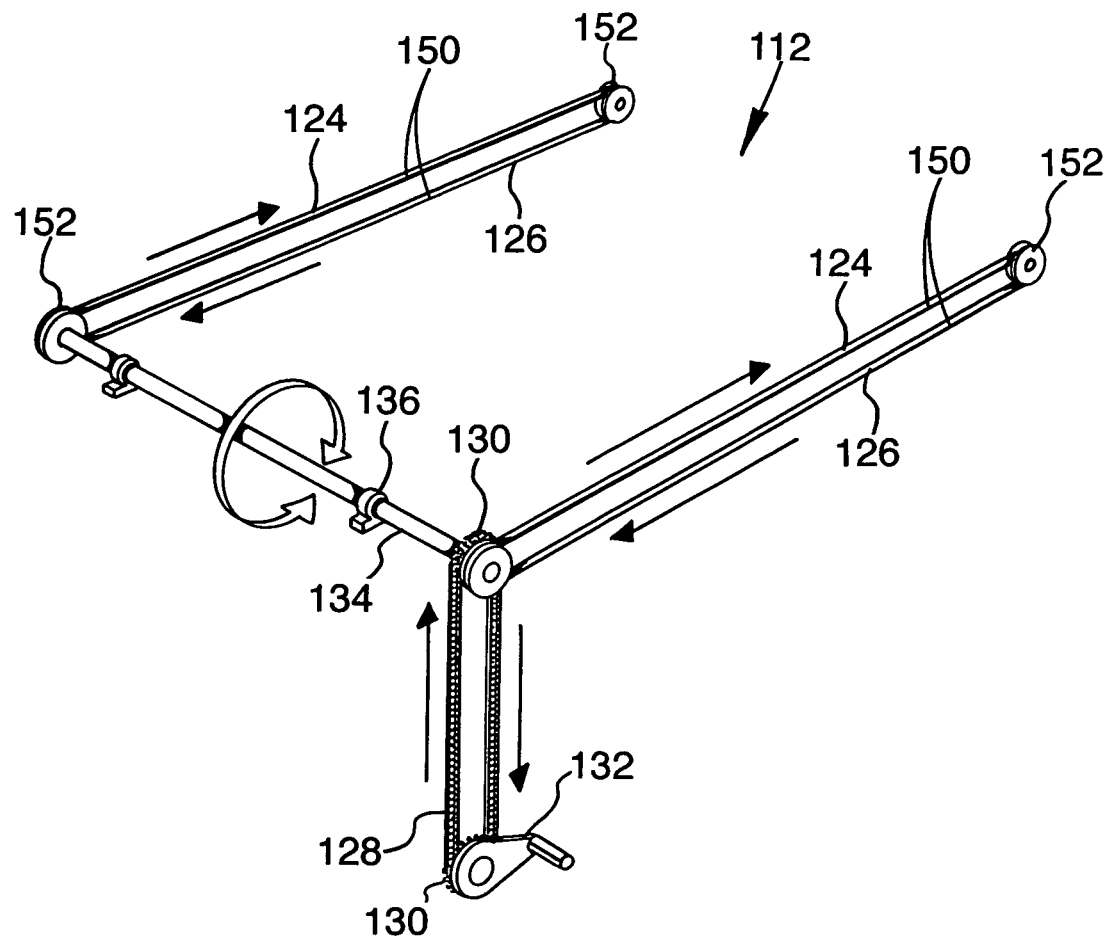
FIG. 4 depicts a perspective view of a second embodiment of a prior art cable drawing system 112.

Now adding FIG. 3 and FIG. 4 to the consideration, the structure of a second embodiment of cable drawing system 112 (prior art) can be clearly seen. Cover assembly 110 is attached to truck trailer 102. The tarp cover 108 is supported by a series of bows 106. The cable or shaft drawing system 112 moves the bows 106 and tarp 108 to either cover or uncover the truck trailer 102 as desired.

Bow 106 has a prior art detachable fixed end member 216, but can utilize reinforced sliding member 100, in contact with working side 124 of cable drawing system 112. Cable drawing system 112 also includes travel side 126 of cable 150, operated by crank 132 and supported by pulley system 152.

Cable drawing system 112 is attached to truck trailer 102 and cooperates with reinforced sliding member 100. Shaft 134 has shaft mounts 136 which secure the shaft 134 to the truck trailer 102. Cable drawing system 112 has cables 150 which are driven by crank 132 and sprocket 130.

Cable drawing system 112 has shaft 134 which connects cables 150 with crank 132 and sprocket 130. Each side has cables 150 which are connected to tarp cover 108 through bow 106. Cables 150 move tarp cover 108 across the length of truck trailer 102. A set of cables 150 are present on each parallel side of truck trailer 102. Each set of cables 150 has a working side 124 and travel side 126 which cooperate to move tarp cover 108. At the each end of each set of cables 150 is pulley 152 which keep working side 124 and travel side 126 moving smoothly as crank 132 is turned.

As crank 132 is turned, chain 128 is driven which turns sprocket 130. As sprocket 130 is turned, it engages and turns cables 150 on the near side and the shaft 134. Shaft 134 in turn engages pulley 152 at the distal side which engages and turns cables 150 at the distal side. This cooperation moves tarp cover 108 across the bed of truck trailer 102.

Now adding FIG. 5 to the consideration, cover assembly 110 uses fixed end member 200 of this invention with cable drawing system 104. Cover assembly 110 includes tarp cover 108, bow 106 with clamp 202 or 204, cable drawing system 104 or cable drawing system 112, and fixed end member 200. Fixed end member 200 connects bow 106 to cable drawing system 104 or cable drawing system 112 and causes tarp cover 108 to operate. Fixed end member 200 contacts working side 124 of cable drawing system 104 or cable drawing system 112 and causes tarp cover 108 to operate when travel side 126 of cable drawing system 104 or cable drawing system 112 is operated.

Fixed end member 200 can be any of reinforced sliding member 100 as seen in FIG. 5, FIG. 6, FIG. 7, FIG. 8, FIG. 9, FIG. 10, or FIG. 11. Fixed end member 200 is distinguished by the presence of U-bolt 230. There is a U-bolt 230 present and attached to cable 150 on each side of fixed end member 200. U-bolt 230 is a standard U-bolt available at many hardware stores or other commercial sources. Therefore fixed end member 200 causes tarp cover 108 to move when either drawing system 104 or 112 is activated. The remainder of the bows 106 with reinforced sliding member 100 simply follow the movement of fixed end member 200.

Now adding to FIG. 6 to the consideration, the standard bow 114 of the prior art can be clearly seen. Standard bow 114 has enclosed end 206. Enclosed end 206 has weld 190 to attach it to the remainder of standard bow 114. Nylon wear bar 160 protects standard bow 114 from wear and damage during ordinary operation. Standard bow 114 cooperates with tarp cover 108 and drawing system 104 or 112.

Standard bow 114 does not allow for easy replacement in case of damage. Every standard bow 114 must be removed from cables 150 until the damaged bow 114 is reached and removed. The ends of cable 150 fray and become sharp and dangerous to handle. Once the damaged bow 114 is removed, it must be replaced and the other bows 114 must be reattached to cable 150. Thus, this is a dangerous and time consuming process.

Figure 7:
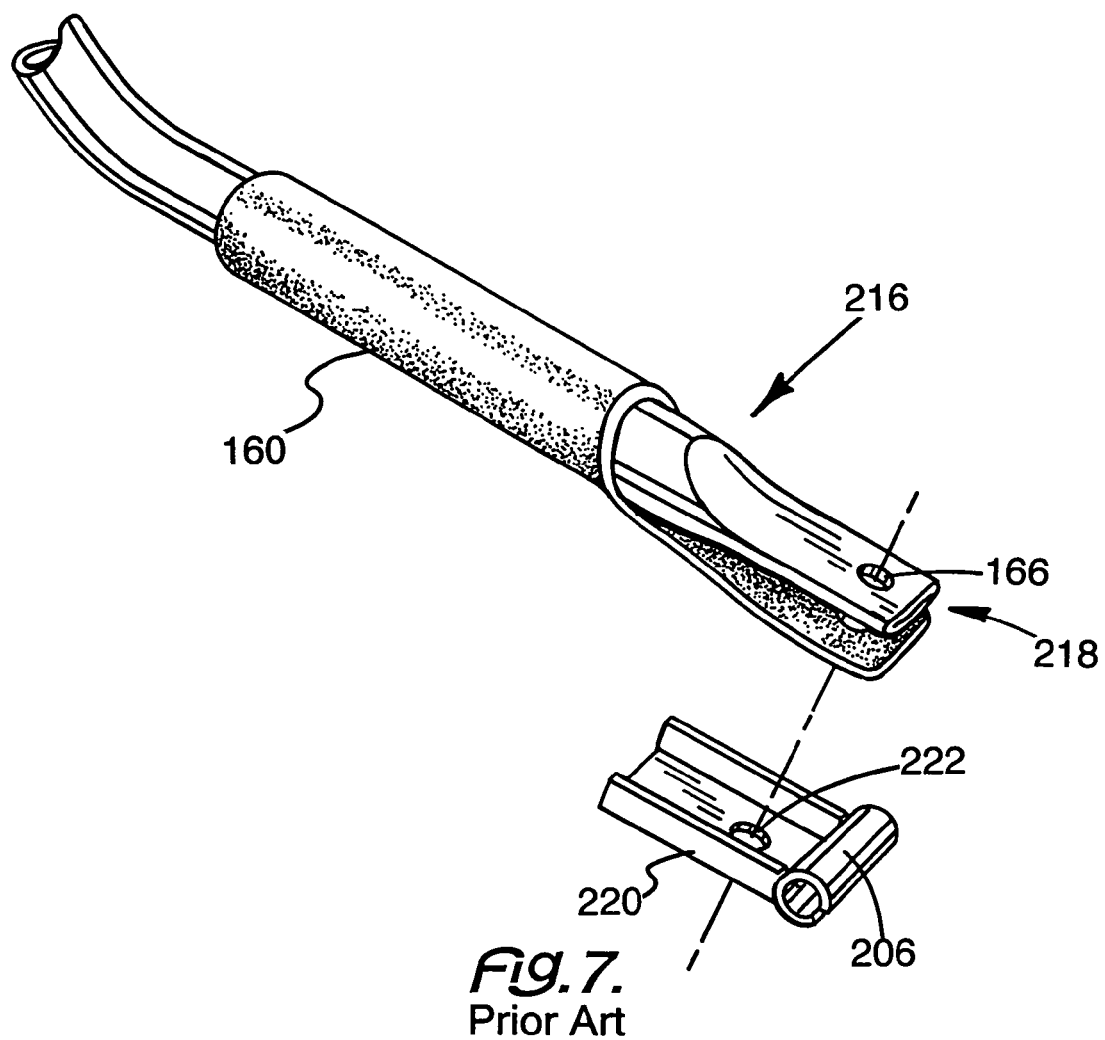
FIG. 7 depicts a bottom perspective view, exploded view of a detachable fixed end member 216 of the prior art.
Figure 8:
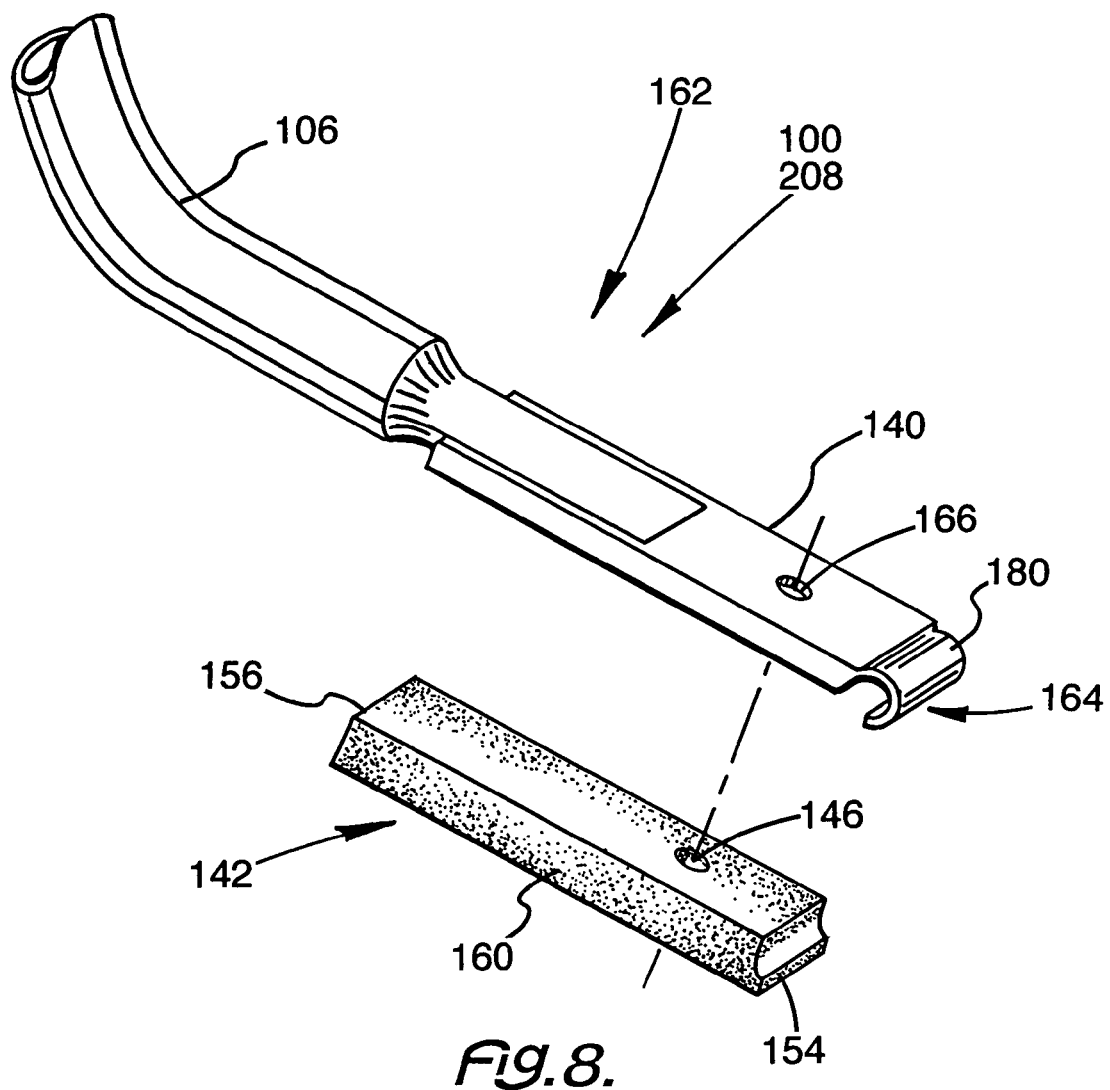
FIG. 8 depicts a perspective view, exploded view of short sliding member 208 of this invention using short cradle 142.

Now adding to FIG. 7 to the consideration, an embodiment of detachable fixed end member 216 can be clearly seen. Detachable fixed end member 216 has nylon wear bar 160, pinched end 218, and end clamp 220. Pinched end 218 has pinched clamp aperture 166, end clamp 220 has end clamp aperture 222, and nylon wear bar 160 has wear bar aperture 214. Clamp aperture 166, end clamp aperture 222, and wear bar aperture 214 can be secured with a standard nut and bolt assembly thus securing pinched end 218 to end clamp 220. The standard nut and bolt assembly can be replaced with any suitable fastening mechanism ("hereafter nut and bolt assembly").

End clamp 220 has enclosed end 206. Enclosed end 206 directly connects to cable 150 and secures bow 106 on cable 150. End clamp 220 can be separated from pinched end 218. Pinched end 218 is directly connected to and part of bow 106. Thus, when bow 106 is damaged from normal wear and tear during operation of truck trailer 102, bow 106 can be replaced without removing other or unnecessary bows 106. Pinched end 218 is disconnected from end clamp 220 by releasing nut and bolt assembly. End clamp 220 remains connected to cable 150 while bow 106 is disconnected. A new bow 106 is connected to end clamp 220 through pinched end 218 and is secured with nut and bolt assembly. As a result, bow 106 is replaced without removing other bows 106 unnecessarily.

However, end clamp 220 can be damaged or broken through normal use of the cover assembly. When end clamp 220 needs to be replaced, each end clamp 220 and bow 106 must be removed until the damaged end clamp 220 is reached and replaced. Then, each end clamp 220 must be remounted on cable 150. While end clamp 220 is an improvement over the prior art, it still is not the most efficient method for securing bow 106 to cable 150. The dangers of workers handling frayed cables 150 are still present.

Nylon wear bar 160 protects bow 106 and pinched end 218 from being damaged during normal operation of truck trailer 102. Nylon wear bar 160 is depicted as being made of nylon but any suitable material can be substituted for nylon. For example, nylon wear bar 160 can be made of rubber.

Now adding FIG. 8, FIG. 9, FIG. 10, and FIG. 11 to the consideration, various embodiments of reinforced sliding member 100 can be clearly seen. Specifically referring to FIG. 8, bow 106 has short cradle 142 connected thereto. More particularly, short cradle 142 has slide clamp 140 with short cradle 142 attachable thereto. Short cradle 142 includes a cradle aperture 146 and an arced end 154. Arced end 154 is oppositely disposed from flat end 156. Slide clamp 140 has a bow end 162 secured to bow 106, and a clip end 164 oppositely disposed from bow end 162. Clamp aperture 166 is present in slide clamp 140. Slide clamp 140 has open end 180.

With clamp aperture 166 and cradle aperture 146 in alignment, a nut and bolt assembly can join slide clamp 140 and short cradle 142 to form short sliding member 208. More particularly, arced end 154 and clip end 164 cooperate to contain working side 124 of cable drawing system 104 or 112 (FIG. 2 and FIG. 4), and permit bow 106 to slide efficiently.

Figure 9:
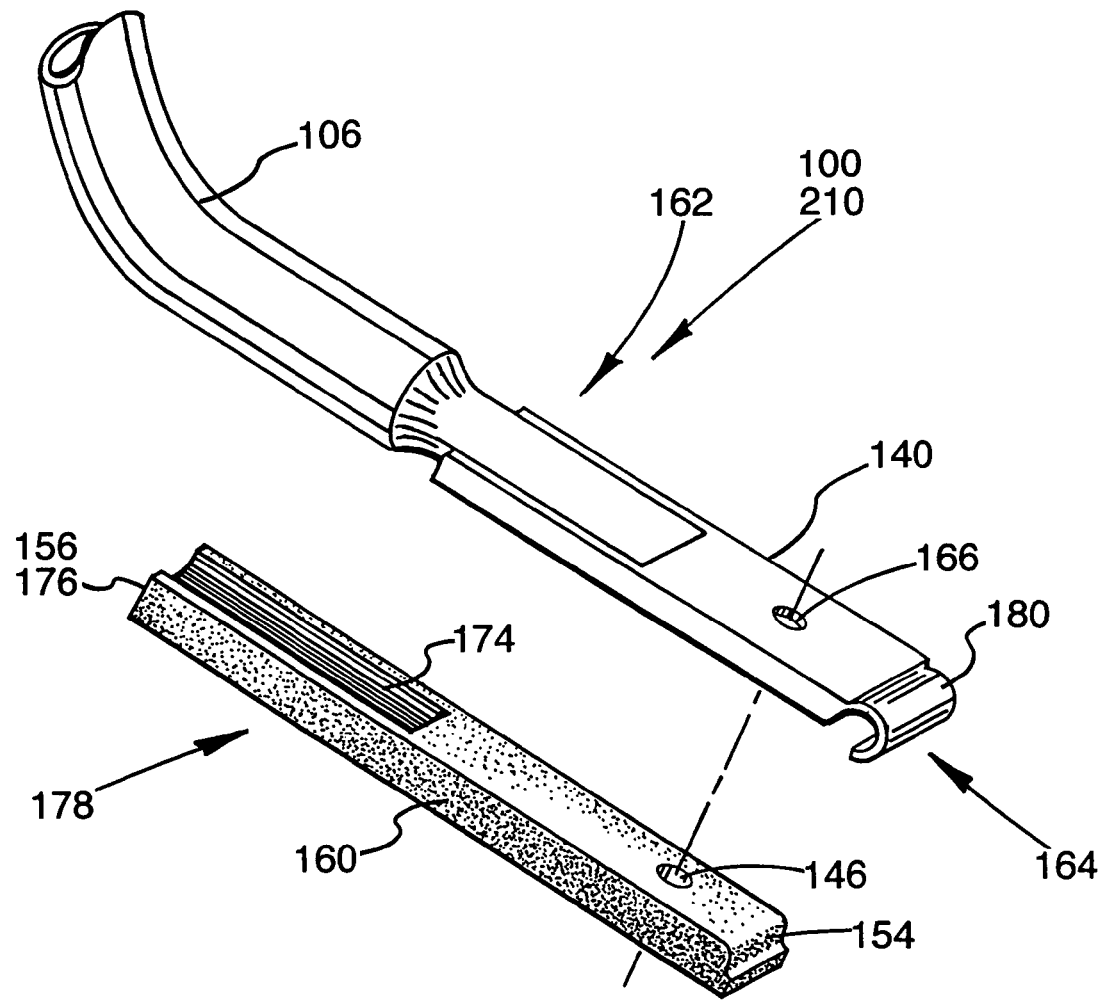
FIG. 9 depicts perspective view, exploded view of short sliding member 208 of this invention using long cradle 178.

Now referring specifically to FIG. 9, the structure of long sliding member 210 can be clearly seen. Long sliding member 210 has a similar structure and assembly as short sliding member 208. The major structural difference between the two is that long sliding member 210 has bow groove 174 on bow receiving end 176 to accept the end of bow 106 that is protected by long cradle 178. The long cradle 178 is longer and protects more of the bow 106 and slide clamp 140 than the short sliding member 208. This long cradle 178 provides more protection against wear and damage than the short sliding member 208.

Long cradle 178 includes a cradle aperture 146 and an arced end 154. Arced end 154 is oppositely disposed from flat end 156. Slide clamp 140 has a bow end 162 secured to bow 106, and a clip end 164 oppositely disposed from bow end 162. Clamp aperture 166 is present in slide clamp 140.

With clamp aperture 166 and cradle aperture 146 in alignment, a nut and bolt assembly can join slide clamp 140 and long cradle 178 to form long sliding member 210. More particularly, arced end 154 and clip end 164 cooperate to contain working side 124 of cable drawing system 104 and 112 (FIG. 2 and FIG. 4), and permit bow 106 to slide efficiently.

Even more efficiently, bow 106 fits into bow groove 174 of long cradle 178, thereby further reinforcing the structure. Cover assembly 110 becomes even stronger.

Furthermore, long sliding member 210 is a sliding member because slide clamp has an open end 180. Open end 180 attaches directly to working side 124 and slides due to the open structure.

Figure 10:
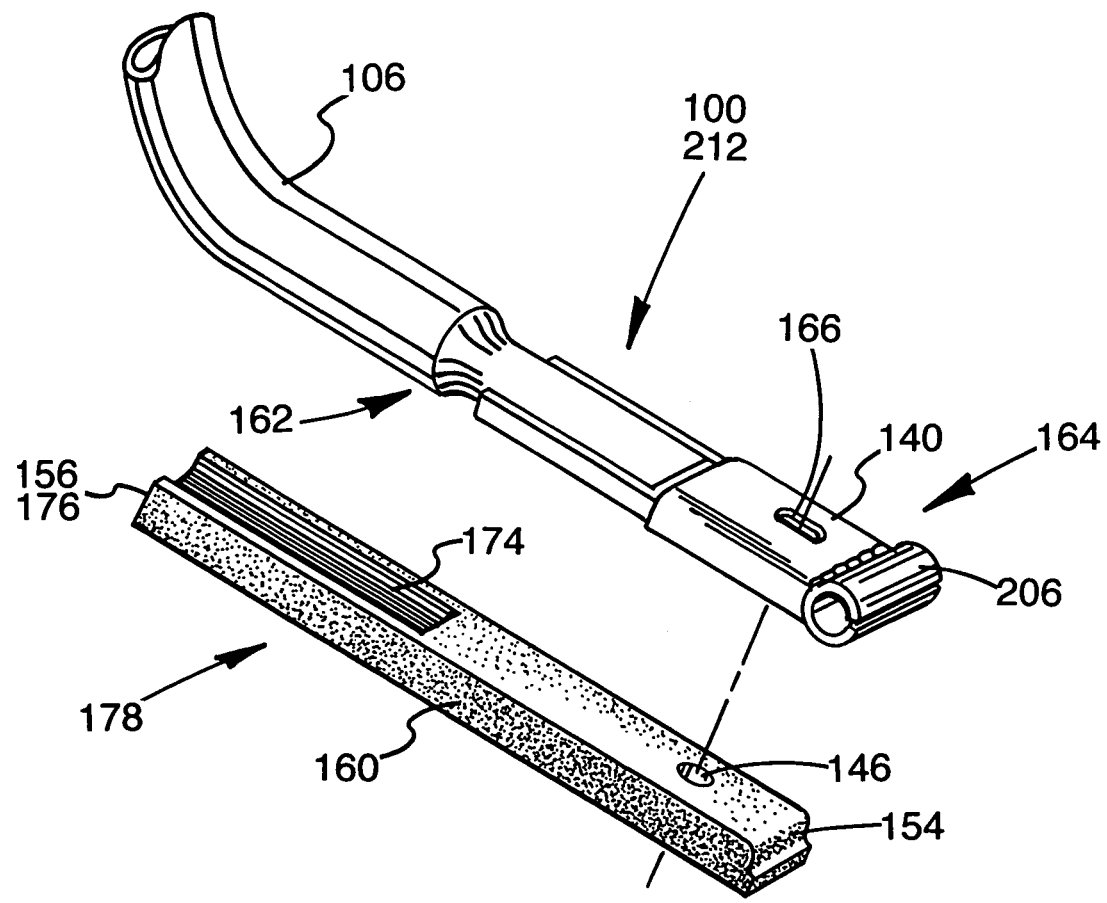
FIG. 10 depicts a perspective, exploded view of short sliding member 208 of this invention using fixed end clamp 202.

Now referring specifically to FIG. 10, the structure of long fixed member 212 can be clearly seen. Long fixed member 212 has a similar structure and assembly as long sliding member 210. The major structural difference between the two is that long fixed member 212 has an enclosed end 206 as opposed to an open end 180. Enclosed end 206 attaches directly to cable 150 and does not allow enclosed end to slide about the length of cable 150.

Long cradle 178 has bow groove 174 on bow receiving end 176 to accept the end of bow 106 that is protected by long cradle 178. The long cradle 178 is longer and protects more of the bow 106 and slide clamp 140 than the short sliding member 208. This longer cradle 178 provides more protection against wear and damage than the short sliding member 208.

Long cradle 178 includes a cradle aperture 146 and an arced end 154. Arced end 154 is oppositely disposed from flat end 156. Slide clamp 140 has a bow end 162 secured to bow 106, and a clip end 164 oppositely disposed from bow end 162. Clamp aperture 166 is present in slide clamp 140.

Figure 11:
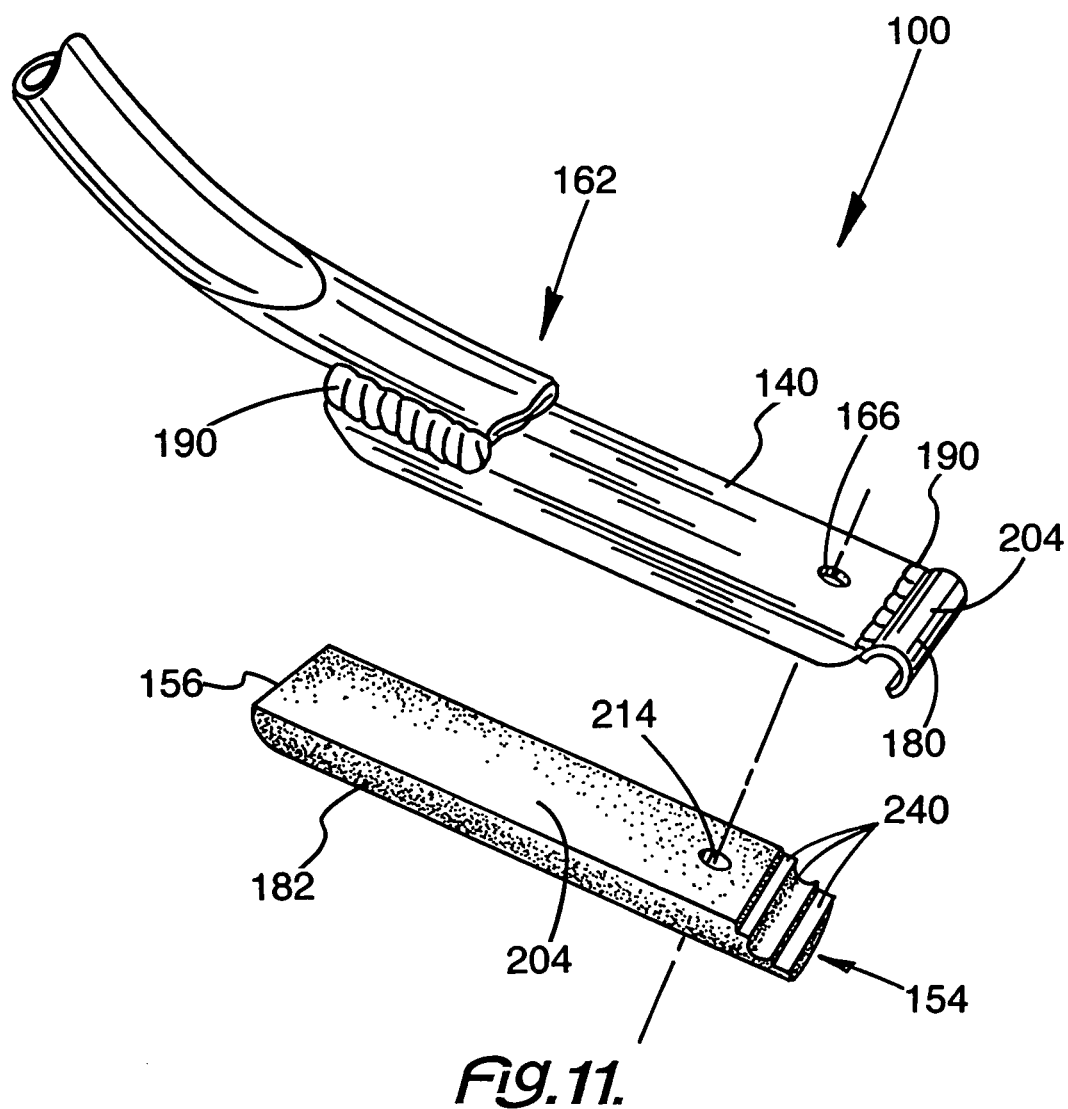
FIG. 11 depicts a top perspective view, exploded view of a detachable fixed end member 216 of this invention.
Figure 12:
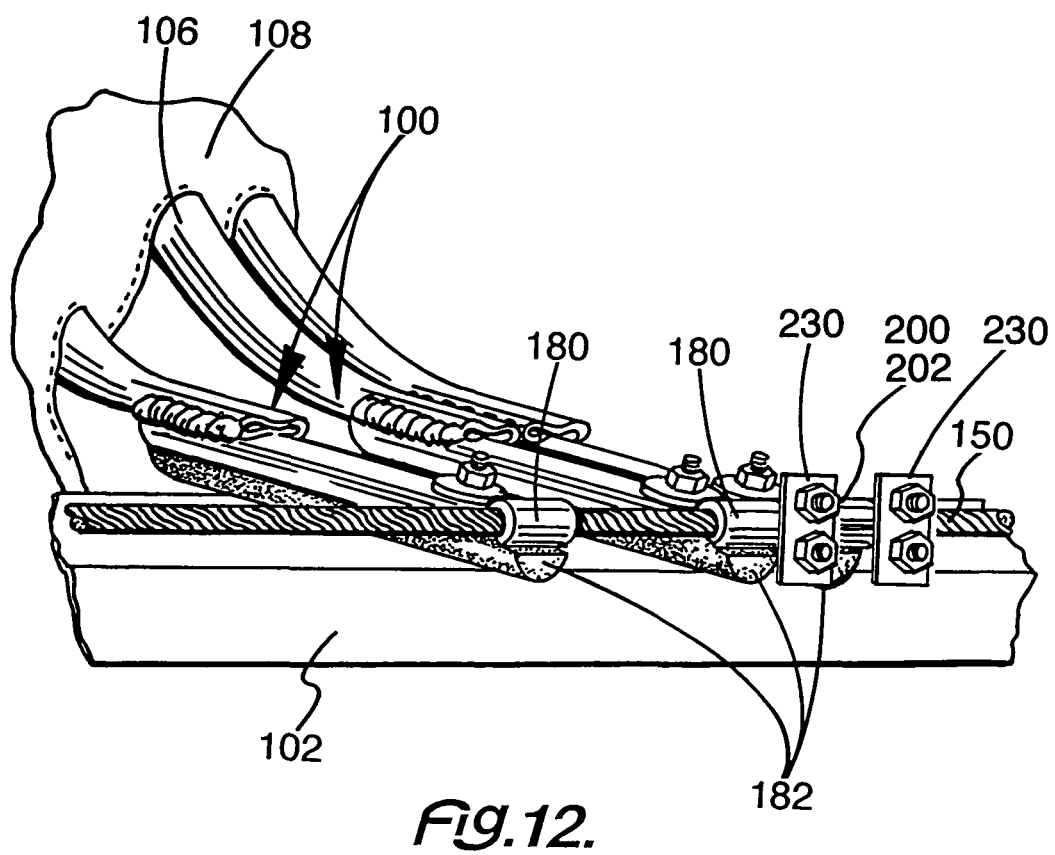
FIG. 12 depicts a perspective view of nylon wear bar 160 which glides along the top of truck trailer 102.

Now referring specifically to FIG. 11 and FIG. 12, the structure of reinforced sliding member 100 can be clearly seen. Reinforced sliding member 100 has bow 106, slide clamp 140, open ended clamp 204, and rounded nylon wear bar 182. Slide clamp 140 has clamp aperture 166 and rounded nylon wear bar 182 has wear bar aperture 214. Clamp aperture 166 and wear bar aperture 214 align and can be secured with a nut and bolt assembly to form a secure and stable attachment.

Slide clamp 140 is welded 190 to bow 106. Also, open ended clamp 204 is welded 190 to slide clamp 140. While welding 190 is the preferred securing mechanism, any suitable securing mechanism can be utilized as long as it forms a strong and stable attachment.

Rounded nylon wear bar 182 provides for a smoother slide of the tarp cover 108. In this fashion, the tarp cover 108 is used more efficiently. Also, rounded nylon wear bar 182 protects the slide clamp 140 with open ended clamp 204 from wear and tear caused by the truck or general use of bow 106. Thus, rounded nylon wear bar 182 greatly extends the useful life of bow 106.

Rounded nylon wear bar 182 has arced end 154 oppositely disposed from flat end 156. Slide clamp 140 has open ended clamp 204. More particularly, arced end 154 has a series of ridges 240 which are specifically designed to cooperate with open ended clamp 204 to securely attach bow 106 to cable 150. These ridges 240 cooperate to securely contain working side 124 of cable drawing system 104 and 112 (FIG. 2 and FIG. 4), and permit bow 106 to slide efficiently.

Open ended clamp 204, with open end 180, makes replacing bow 106 much easier and more efficient than the prior art. Over time, bow 106 becomes bent or damaged due to wear and tear from ordinary operations of truck trailer 102. In the prior art, the user started at the very end and has to remove every bow 106 until the damaged bow 106 is removed from the cable 150. This is a difficult and time consuming process because the end of the cable 150 frays making it difficult to slide bow 106 off and on the cable 150. Also, there is an element of danger present due to the sharp nature of the frayed end of cable 150.

Open ended clamp 204 eliminates these problems and greatly simplifies the replacement of damaged bow 106. Open ended clamp 204 slips over cable 150 but is not permanently attached as seen in the prior art. When bow 106 is damaged, the damaged bow 106 is easily removed and a new bow 106 is installed. There is no need to remove non damaged bows 106 because open ended clamp 204 simply slides on and off cable 150. This system saves time and eliminates the danger of handling the frayed end of cable 150. The nut and bolt assembly is unfastened and slide clamp 140 from rounded nylon wear bar 182 and the removal of damaged bow 106 is simplified.

Figure 13:
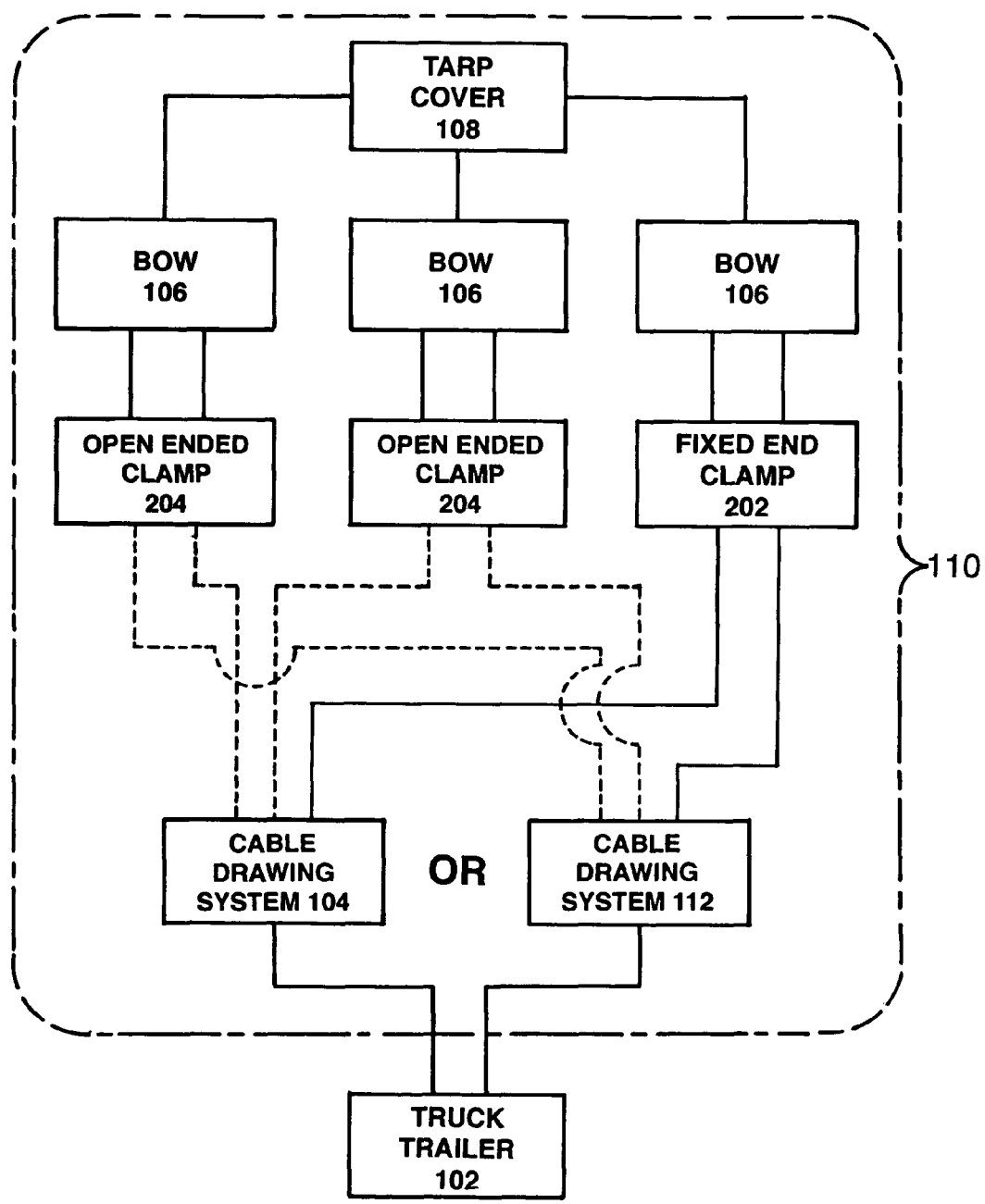
FIG. 13 depicts a block diagram of reinforced sliding member 100 of this invention in use on truck trailer 102.

Now adding FIG. 13 to the consideration, the flexibility of cover assembly 110 can be clearly seen. Cover assembly 110 includes tarp cover 108, which is supported by a series of bows 106 with open ended clamp 204, and fixed end member 200. Cover assembly 110 is connected to truck trailer 102. In the cover assembly 110 is tarp cover 108. Tarp cover 108 is connected to a series of bows 106 and at least one fixed end member 200. There can be as many or as few of bows 106 and fixed end members 200 as necessary support tarp cover 108 on truck trailer 102.

On each bow 106 and fixed end member 200 is a clamp 204. Fixed end clamp 202 or open ended clamp 204 secures the bow 106 to the cable 150 on truck trailer 102. This system provides great flexibility for cover assembly 110. U-bolt 230 provides a brace to fixed end clamp 202 and secures it to cable 150. Specific examples of slide clamp 140 or open ended clamp 204 can be seen FIG. 6, FIG. 7, FIG. 8, FIG. 9, FIG. 10, and FIG. 11. Thus slide clamp 140 or open ended clamp 204 provides great advantages for cover assembly 110.

Reinforced sliding member 100, short sliding member 208, long sliding member 210, long fixed member 212 and fixed end member 200 also has nylon wear bar 160 or 182. Nylon wear bar 160 or 182 help protected fixed end member 200 and sliding members 100, 208, 210, and 212 and part of bow 106 from damage as truck trailer 102 is used. Nylon wear bar 160 or 182 is depicted as nylon but can be made of any material which is suitable for protecting fixed end member 200 or sliding members 208, 210, and 212 and bow 106 from damage. For example, another suitable material wear material is rubber.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A reinforced sliding member for use with a bow of a cover assembly, the cover assembly, the bow, and the reinforced sliding member cooperating to permit an open bed truck to be efficiently covered and uncovered, comprising:
    a) the reinforced sliding member being an open ended clamp;
    b) the reinforced sliding member cooperating with an enclosed end fixed end member to cover and uncover the open bed truck;
    c) the reinforced sliding member including a wear bar and a slide clamp with a clip end;
    d) a fastening means comprising a single nut and bolt assembly securing the wear bar to the slide clamp with the clip end to support the bow in the cover assembly;
    e) the slide clamp having a clamp aperture;
    f) the wear bar comprising a cradle and having a cradle aperture;
    g) the clamp aperture and the cradle aperture being in alignment when joined together and receiving the single nut and bolt assembly therethrough to form the reinforced sliding member;
    h) the wear bar being separate from the slide clamp with the clip end for ease of repair, or removal and replacement of a single bow which can be removed while leaving any adjacent bows in place;
    i) the wear bar having an arced end adjacent to the clip end;
    j) the clip end and the arced end cooperating to form an enclosed end when joined together by the single nut and bolt assembly to contain an actuating cable for the cover assembly;
    k) the sliding member having a bow groove on a bow receiving end thereof to protect the bow;
    l) the cradle having a bottom surface; and
    m) the arced end having at least one ridge to further secure the connection between the sliding member and the cable.

2. The reinforced sliding member of claim 1 further comprising:
    a) the wear bar being a cradle;
    b) the cradle fitting with the slide clamp;
    c) the cradle including the cradle aperture for attachment to the slide clamp;
    d) the cradle including an arced end for contact with the cable;
    e) the cradle having a flat end oppositely disposed from the arced end;
    f) the slide clamp having a bow end secured to the bow;
    g) the slide clamp having the clip end oppositely disposed from the bow end;
    h) the clip end having an open end; and
    i) the open end cooperating with the arced end for engaging about and sliding along the cable.

3. The reinforced sliding member of claim 1 further comprising:
    a) the cradle having a bow receiving end oppositely disposed from the arced end.

4. In a cover assembly for an open trailer, the cover assembly including a cable drawing system to cover or uncover the open trailer with a tarpaulin, the tarpaulin being supported on the cable drawing system with at least one bow which cooperates with a reinforced sliding member, the improvement comprising:
    a) the reinforced sliding member releasably securing the at least one bow to the cable drawing system:
    b) the reinforced sliding member being an open ended clamp;
    c) the reinforced sliding member cooperating with an enclosed end fixed end member to cover and uncover the open trailer with the tarpaulin;
    d) the reinforced sliding member including a wear bar and a slide clamp with a clip end;
    e) a fastening means securing the wear bar to the slide clamp with the clip end to support the bow in the cover assembly;
    f) the slide clamp having a clamp aperture;
    g) the wear bar having a cradle aperture;
    h) the clamp aperture and the cradle aperture receiving the fastening means to form the reinforced sliding member;
    i) the reinforced sliding member being separate from the cable drawing system for ease of repair, or removal and replacement of a single bow thereby leaving any adjacent bow in place;
    j) the wear bar having an arced end adjacent to the clip end; and
    k) the clip end and the arced end cooperating to form a closed end within which to contain the cable; and
    l) the sliding member having a bow groove on the bow receiving end thereof to protect the at least one bow.

5. The improvement of claim 4 further comprising:
a) the wear bar being a cradle;
b) the cradle fitting with the slide clamp;
c) the cradle having a flat end oppositely disposed from the arced end;
d) the slide clamp having a bow end secured to the bow;
e) the slide clamp having the clip end oppositely disposed from the bow end; and
f) the clip end having an open end.

6. A method for repairing a cover assembly for an open trailer, the cover assembly including a cable drawing system to cover or uncover the open trailer with a tarpaulin, the tarpaulin being supported on the cable drawing system with at least one bow engaged therealong through the cooperation of a reinforced sliding member, the method comprising:
a) providing the reinforced sliding member releasably securing the at least one bow to the cable drawing system;
b) providing the reinforced sliding member as an open ended clamp;
c) allowing the reinforced sliding member to cooperate with an enclosed end fixed end member;
d) providing the reinforced sliding member with a wear bar and a slide clamp with a clip end;
e) securing the wear bar and the slide clamp with a fastening means to support the at least one bow in cover assembly;
f) securing the open ended clamp of the reinforced sliding member to the cable drawing system in a slidable and releasable fashion;
g) providing the wear bar with an arced end adjacent to the clip end with the clip end and the arced end cooperating to form a releasably closed end to contain the cable; and
h) removing and reinserting the at least one bow as desired by separating the wear bar from the slide clamp with the clip end and removing the attached bow while leaving a second bow in place.

7. The method of claim 6 further comprising,
a) the slide clamp having a clamp aperture;
b) the wear bar having a cradle aperture;
c) the clamp aperture and the cradle aperture receiving a single fastener to form the reinforced sliding member;
d) the enclosed end fixed end member aiding to secure the remaining reinforced sliding members in position on the cable;
e) the wear bar being a cradle;
f) the cradle having a flat end oppositely disposed from the arced end;
g) the slide clamp having a bow end secured to the at least one bow;
h) the slide clamp having the clip end oppositely disposed from the bow end;
i) the clip end having an open end;
j) the open end cooperating with the arced end for engaging about and sliding along the cable;
k) the fastening means being a single nut and bolt assembly; and
l) the single nut and bolt assembly fitting in the clamp aperture and the cradle aperture to join the slide clamp and the cradle to form a sliding member.

8. The method of claim 6 further comprising:
a) the cradle having a bow receiving end oppositely disposed from the arced end.

9. The method of claim 8 further comprising:
a) the sliding member having a bow groove on the bow receiving end thereof to protect the at least one bow.

\* \* \* \* \*